US006963568B2

(12) United States Patent
Rajan

(10) Patent No.: US 6,963,568 B2
(45) Date of Patent: Nov. 8, 2005

(54) METHOD FOR TRANSMITTING DATA PACKETS, METHOD FOR RECEIVING DATA PACKETS, DATA PACKET TRANSMITTER DEVICE, DATA PACKET RECEIVER DEVICE AND NETWORK INCLUDING SUCH DEVICES

(75) Inventor: Govinda Nallappa Rajan, Huizen (NL)

(73) Assignee: Lucent Technologies Inc., Murray Hill, NJ (US)

( * ) Notice: Subject to any disclaimer, the term of this patent is extended or adjusted under 35 U.S.C. 154(b) by 911 days.

(21) Appl. No.: 09/911,269

(22) Filed: Jul. 23, 2001

(65) Prior Publication Data

US 2002/0018467 A1 Feb. 14, 2002

(30) Foreign Application Priority Data

Jul. 24, 2000 (EP) .......................................... 00306265

(51) Int. Cl.[7] ............................................... H04L 12/56
(52) U.S. Cl. ...................................... 370/392; 370/477
(58) Field of Search ............................... 370/389, 392, 370/401, 473, 474, 470, 471, 477, 469, 444

(56) References Cited

U.S. PATENT DOCUMENTS

| 5,521,940 | A   |   | 5/1996  | Lane et al. ................. 375/240 |
| 6,366,961 | B1  | * | 4/2002  | Subbiah et al. ............. 709/238 |
| 6,704,311 | B1  | * | 3/2004  | Chuah et al. ............... 370/389 |
| 6,721,333 | B1  | * | 4/2004  | Milton et al. ............... 370/469 |
| 6,804,237 | B1  | * | 10/2004 | Luo et al. ................... 370/392 |
| 6,804,251 | B1  | * | 10/2004 | Limb et al. ................. 370/444 |

OTHER PUBLICATIONS

El–Khatib, Luo, Bochmann, "Multiplexing Scheme for RTP Flows Between Access Routers <draft–letf–avt–multiplexing–rtp–00.txt>", *Internet Engineering Task Force*, pp. 1–13 (Jun. 24, 1999).

Rosenberg, Schutzrinne, "Issues and Options for RTP Multiplexing", *Internet Engineering Task Force*, pp. 1–27 (Mar. 1, 1999).

Rosenberg, Schulzrinne, "An RTP Payload Format For User Multiplexing", *Internet Engineering Task Force*, pp. 1–10 (Nov. 6, 1998).

* cited by examiner

*Primary Examiner*—Hassan Kizou
*Assistant Examiner*—Albert T. Chou

(57) ABSTRACT

A method for transmitting data packets includes determining from the first header part of first data packets the original first destination address, storing the original first destination address of the first data packet in storing means, discarding the first header part, storing in storing means the first body part of the first data packet. Thereafter, a concatenated or second data packet is made that includes in the body part: a data part including the first body parts and a content information part including information about the number and position of the first body parts. Thereafter, the concatenated or second data packet is transmitted to the second destination address. Hereby an increase of the payload is achieved and therefore more effective use of network connections bandwidth. A method to receive a concatenated or second data packet, devices to perform these methods and a computer network including such devices are also described.

21 Claims, 6 Drawing Sheets

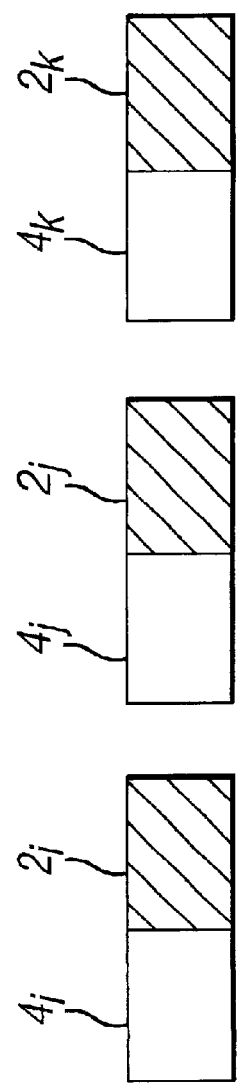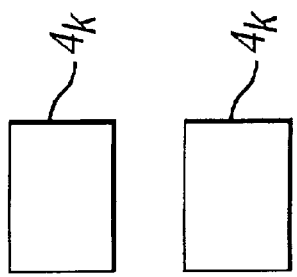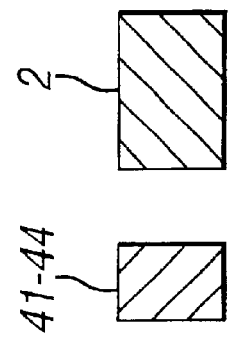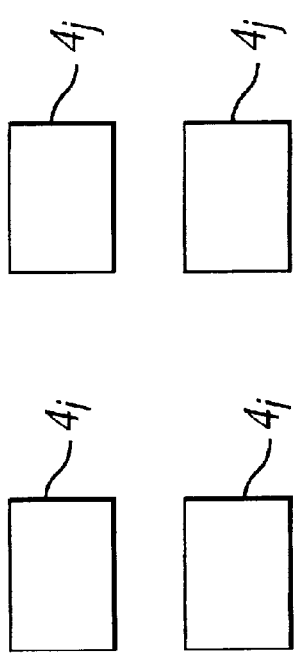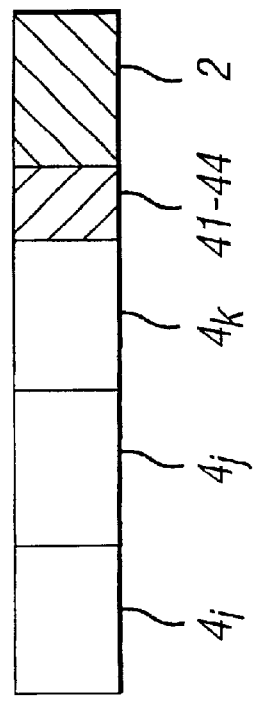
FIG. 3A   FIG. 3B   FIG. 3C   FIG. 3D

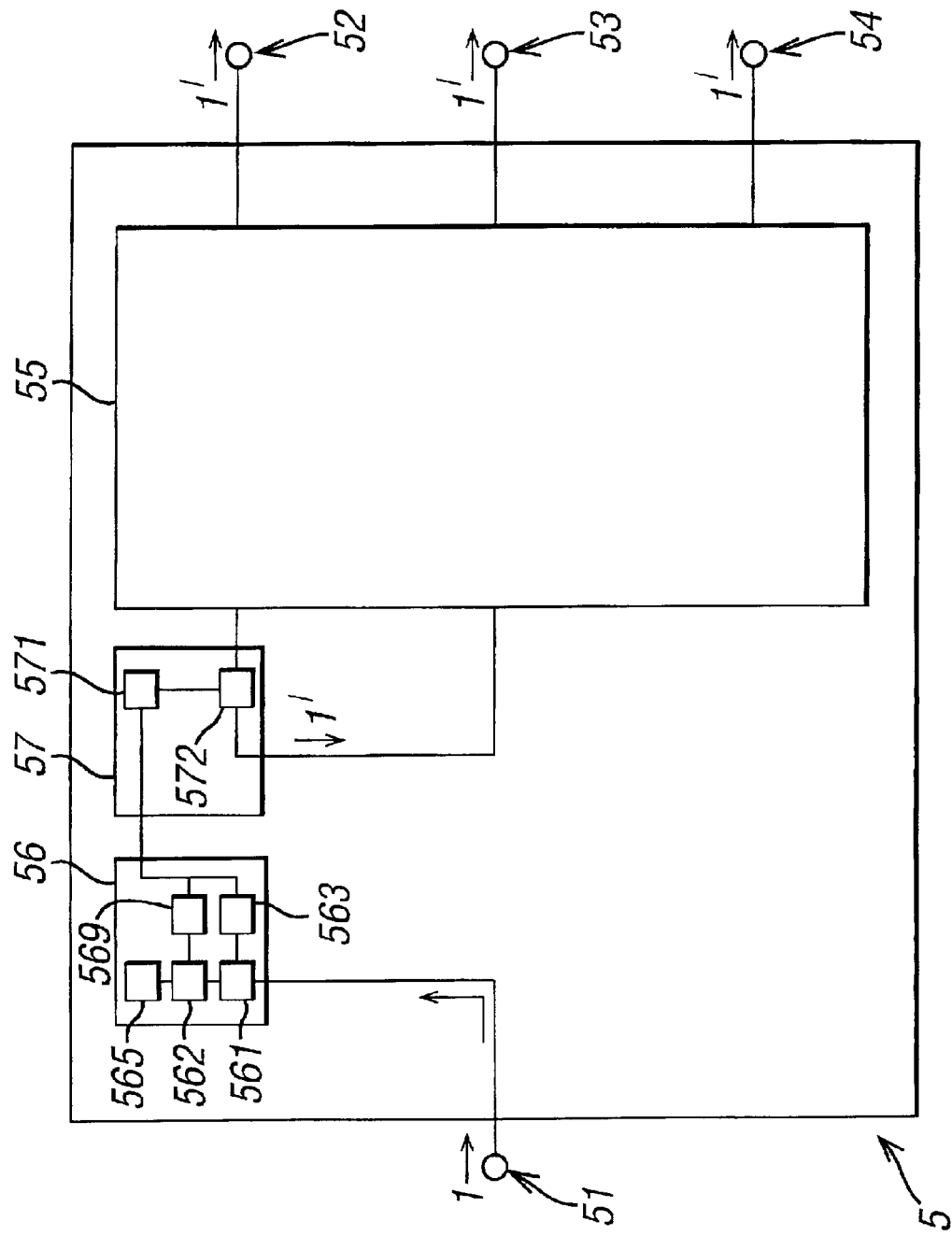

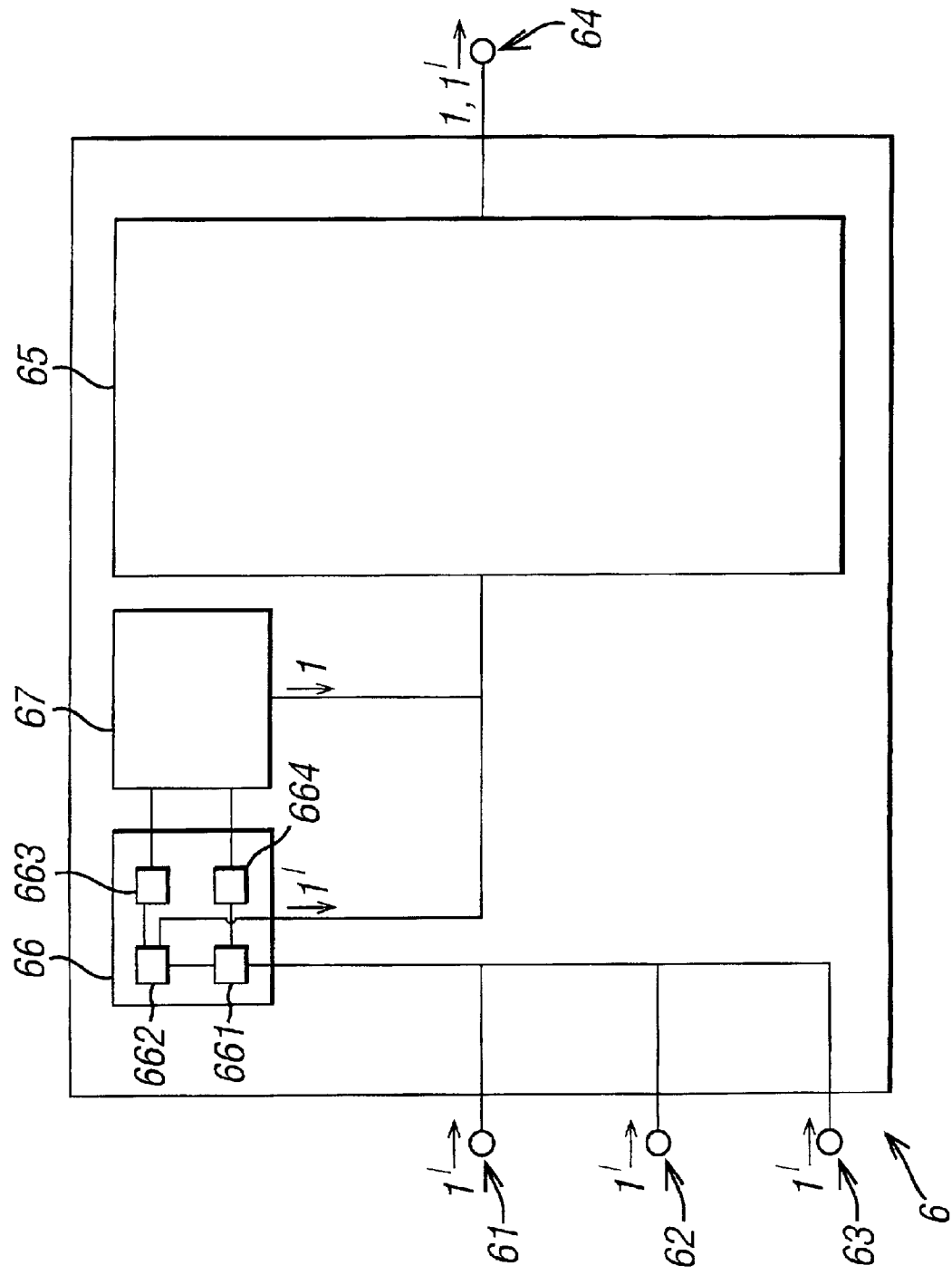

METHOD FOR TRANSMITTING DATA PACKETS, METHOD FOR RECEIVING DATA PACKETS, DATA PACKET TRANSMITTER DEVICE, DATA PACKET RECEIVER DEVICE AND NETWORK INCLUDING SUCH DEVICES

CROSS REFERENCE TO RELATED APPLICATION

This application claims priority of European Patent Application No. 00306265.0, which was filed on 24 Jul. 2000.

FIELD OF THE INVENTION

The invention relates to a method for transmitting data packets and a method for receiving data packets. Furthermore, the invention relates to a data packet transmitter device, a data packet receiver device and a communication network including such devices.

BACKGROUND OF THE INVENTION

The following terminology is used in this application: a data packet is a data unit of variable size; a header is a part of a data packet containing information about the data packet, for example it's type, source address and destination address; the body part or payload is the part of the data packet containing data transmitted via the packet; a datagram is a data packet containing by itself all information needed to transmit the packet to its destination; so the network used for transmitting does not need to be configured before sending the packets; a connectionless network is a network in which data can be sent without setting up a connection in advance; a router device is a network node connected to two or more networks that may be of the same type or may be of different types, said router device in use forwarding data packets from one network to another.

In communication or computer networks transmission bandwidth is limited; for example a telephone line, as generally used to connect users to the Internet, has a transport capacity of only 28.8 kilobytes per second. A large part of the occupied bandwidth is used in an inefficient manner, because a significant part of the transmitted data packets is not data, but merely information required by transport protocols about the packet itself, for example information on the data packet type or the source and destination address of the packet. It is known that about 38.9% of the packets transmitted via the Internet has a total length of 40 bytes. These packets are in accordance with the Internet Protocol version 4 (IPv4) and since the IPv4 protocol requires 20 bytes of information about the packet, only 50% of the occupied bandwidth is used for payload.

SUMMARY OF THE INVENTION

According to an aspect of the invention, there is provided a method by which the overhead/payload ratio of transmitted packets can be improved, thereby minimising the aforementioned problems of the prior art. In accord with an aspect of the invention, a method for transmitting data packets includes the steps of: extracting from at least two separate first data packets an original first destination address and a first body part containing data to be transmitted by the first data packet; making a concatenated or second data packet and transmitting the concatenated or second data packet to a second destination address, wherein the step of extracting includes: determining a first header part of each first data packet, said first header part containing data packet specific information including an original first destination address; determining from each of said first header parts the original first destination address of the corresponding first data packet; storing the original first destination addresses of the first data packet in address storing means; discarding the first header part; storing in first storing means a remaining part of each of the first data packets, as a first body part, and wherein the concatenated or second data packet includes: a second header part containing second data packet specific information including a second destination address for the concatenated or second data packet, a second body part including: a data part including the first body parts of said first data packets and a content information part including information determining the position of each of the first body parts in the data part, the number of first body parts contained in the concatenated or second data packet and said original first destination addresses of the first body parts.

Such a method increases the effective data transmission, because a single second header part is shared by n first body parts, whereby n-1 headers are omitted.

According to a further aspect of the invention, there is provided a method for receiving data packets transmitted by a transmitting method of the above type, said method for receiving including the steps of: receiving a concatenated or second data packet; extracting each of said first body parts contained in the concatenated or second data packet from the concatenated or second data packet; reconstructing at least one first data packet including; a first header part containing packet specific information and the original first destination address, and the first body part; and transmitting the at least one first data packet to the corresponding original first destination address, wherein the step of extracting includes: determining a second header part containing concatenated or second data packet specific information; and a second body part including: a content information part including information determining the position of each of the first body parts in the data part and information determining the number of first body parts contained in the concatenated or second data packet, and the content information part further containing information about the original first destination addresses of the first body parts, and a data part including the first body parts; storing the at least one first body part and the corresponding original first destination address in storing means.

Thereby reception and use of data packets transmitted by a method according to an aspect of the invention is made possible.

In accord with a further aspect of the invention, there is described a data packet transmitter device and a data packet receiver device, both devices being able to perform one of the methods according to aspects of the invention.

Also, a communication network is provided including at least one transmitter device and at least one receiver device according to aspects of the invention. Thereby a network is provided that reduces the required bandwidth, especially if a significant part of the data packets sent via the network are small packets.

It should be noted that from PCT patent application WO 9847166 a method is known for transmitting data packets between applications running on a client computer and a server computer. In this prior art document, a method is described whereby a connection is established between a client computer and a server computer via the Internet or an intranet, and smaller data packets transmitted via the connection are contained in a large data packet. The large data packet contains an IP (Internet Protocol) header, followed by an UDP (User Datagram Protocol) header, as is required by the IP and UDP standards. After the UDP header a Communication Enhancement Header is placed, containing information about the place and size of the smaller data packets. The method has to be implemented in OSI (Open Systems Interconnection) layer 4 or 5.

However, the known method differs from the present invention, because according to the present invention does not involve a connection established between a client computer and a server computer. Also, the transmitted data packets are not generated or used by applications running on a client computer and a server computer. Furthermore, according to an aspect of the present invention the method does not need to be implemented in a specific OSI layer.

Furthermore, the method proposed in WO 9847166 is disadvantageous because the method requires an extensive communication in accordance with a specific and inflexible protocol in order to establish the connection and only allows to transmit data via the connection, whereby the method can only be applied in a very limited number of networks allowing a connection to be established.

BRIEF DESCRIPTION OF THE DRAWINGS

Further details, aspects and embodiments of the invention are described with reference to the attached drawings, in which:

FIGS. 3 A–D diagrammatically show steps of an example method according to an aspect of the invention;

FIG. 4 diagrammatically shows a router device as an example of a data packet transmitter device according to an aspect of the invention;

FIG. 5 diagrammatically shows a router device as an example of a data packet receiver device according to an aspect of the invention.

DETAILED DESCRIPTION OF THE EXEMPLARY EMBODIMENTS

Figure 1:
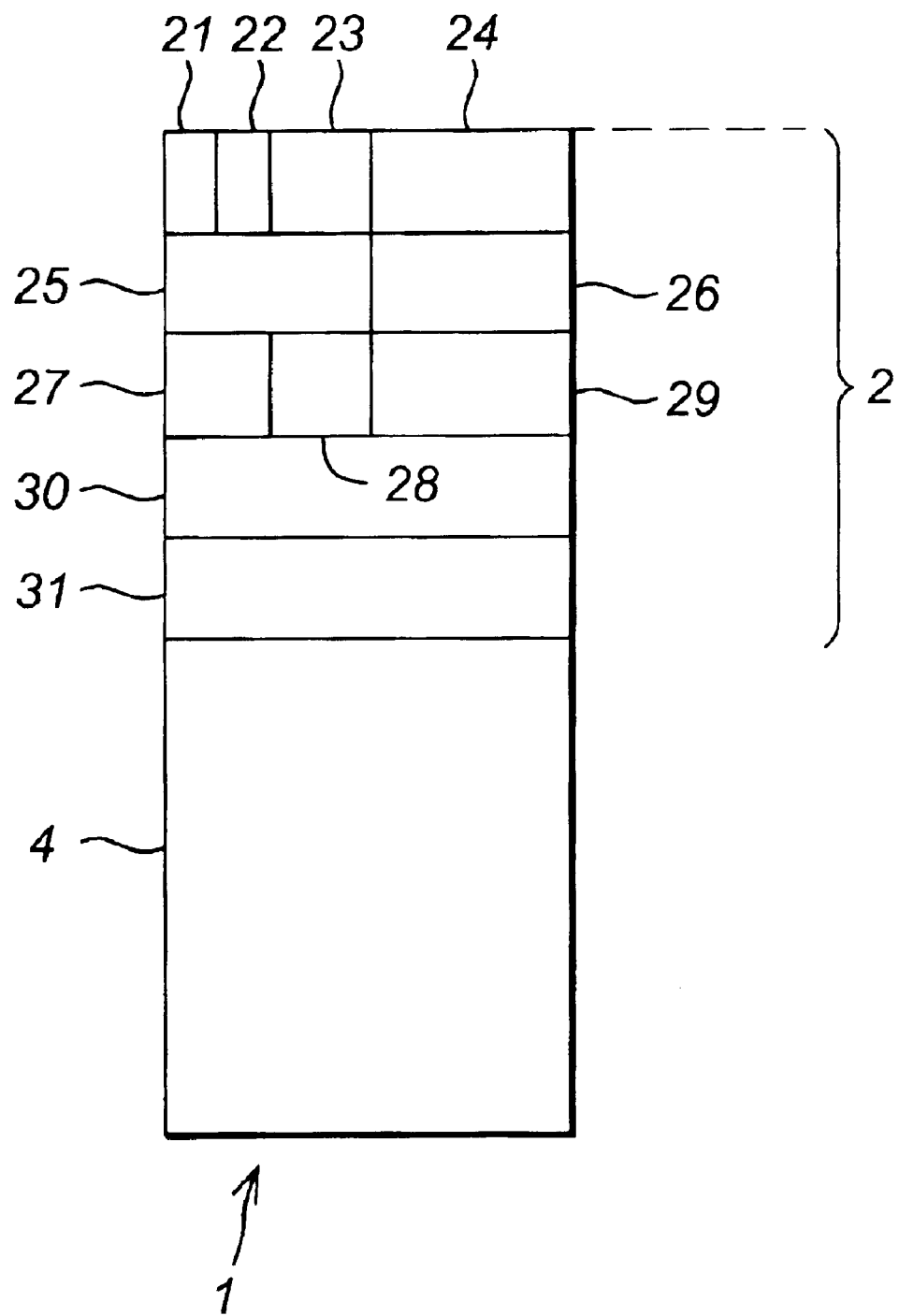
FIG. 1 diagrammatically shows an Internet Protocol datagram as is commonly transmitted.

In FIG. 1, a 40 byte first data packet 1 in accordance with the IPv4 protocol is shown.

The first data packet 1 includes a 20 byte first header part 2, required by the IPv4 protocol, and a 20 byte first body part 4. The first body part includes data transferred via the packet. As can be seen only 50% of the bits in the first data packet is actually data.

The IPv4 first header part contains a 4 bits version field 21 indicating the IP protocol version, which protocol version is 4 in the first data packet 1. After the version field 21, a 4 bits Header Length field 22 is placed, indicating the header size (which is 20 bytes as required by the IPv4 protocol). Thereafter, a Type Of Service field 23 of 8 bits is placed, indicating the type of data. This field 23 distinguishes between possible data types. For example, the Type Of Service field 23 may indicate that the packet contains video data, whereby the packet may be sent with priority. The following field is Length field 24 of 16 bits size indicating the total length of the first data packet. 8 bit Ident field 25 indicates the identity of the first data packet, making it possible to gather IP-datagrams with the same identifier and reassembling them. An 8 bits Fragmentation field 26 contains information necessary to place a number of IP-datagrams with the same identifier in the correct order. A Time To Live field 27 of 4 bits indicates the life time of the packet. A 4 bits Protocol field 28 is a demultiplexing key that identifies a higher level protocol the first data packet should be passed to, for example Transmission Control Protocol (TCP) or UDP. A Checksum field 29, of 8 bits size, is used to check for transmitter errors in the first header part. A 32 bit Source address field 30 specifies the source address of the first data packet, whereas a 32 bit Destination address field 31 specifies an original first destination address of the first data packet.

It should be noted that, although the example method according to an aspect of the invention described below is applied to data packets in accordance with the IPv4 protocol, the invention is not limited to this type of data packets and it should be apparent that the invention can be applied to any type of data packets. It is advantageous to apply a method according to an aspect of the invention to datagrams because datagrams tend to have a large header, whereby the real data occupies a small percentage of the datagram, so reduction of the percentage of bits used by the header is extremely useful. Application of the invention to IP-datagrams is even more advantageous because this type of datagrams is commonly used and as is mentioned above a large part of the transmitted IP-datagrams is of a small size.

As can be seen in FIG. 3 A, first body parts $4_i$, $4_j$, $4_k$, containing data included in the corresponding first data packet $1_i$, $1_j$, $1_k$ and first destination addresses are extracted from first data packets $1_i$, $1_j$, $1_k$.

In order to extract the original first destination addresses and first body parts $4_i$, $4_j$, $4_k$, a first header part $2_i$, $2_j$, $2_k$ of each first data packet $1_i$, $1_j$, $1_k$ is determined. As will be clear from the above description, the first header part $2_i$, $2_j$, $2_k$ contains data packet specific information including the original first destination address. Thereafter, the respective original first destination addresses of the first data packets $1_i$, $1_j$, $1_k$ are extracted from the first header parts $2_i$, $2_j$, $2_k$ and the original first destination addresses are stored in, not shown, storing means. The first header parts $2_i$, $2_j$, $2_k$ are now discarded. As is diagrammatically indicated in FIG. 3 B, the remaining parts of the first data packets $1_i$, $1_j$, $1_k$ are the body parts $4_i$, $4_j$, $4_k$. These body parts are also stored in a, not shown, storing means.

Figure 2:
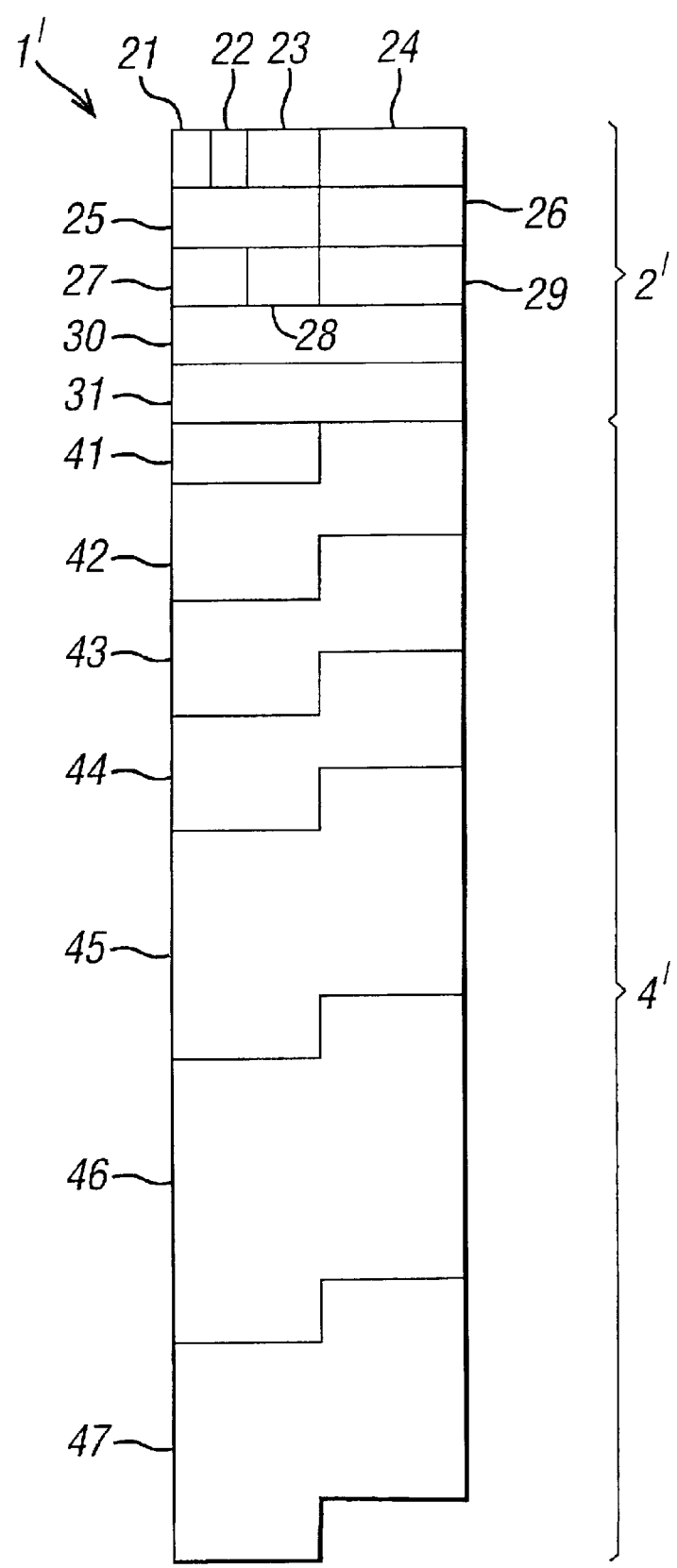
FIG. 2 diagrammatically shows an example of an Internet Protocol datagram after applying an example method according to an aspect of the invention.

After extracting the respective first destination addresses and first body parts $2_i$, $2_j$, $2_k$ from the first data packets $1_i$, $1_j$, $1_k$, a concatenated or second data packet 1' is made based on the first data packets $1_i$, $1_j$, $1_k$. Like the first data packets, the concatenated or second data packet 1' includes a header part 2' and a body part 4', as can be seen in FIG. 2.

The header part 2' contains fields 21', 22', 23', 24', 25', 26', 27', 28', 29', 30', 31' of the same type and size as the first header part, but with settings that correspond to the concatenated or second data packet. For instance, the Length field 24' will now read 106 bytes instead of 40 bytes.

For making the concatenated or second data packet the header part 2' and a content information part 41–44 of the second body part 4' are prepared, as can is diagrammatically shown in FIG. 3C.

The second header part 2' is made in a manner similar to the first header parts 2, as is generally known in the art. As a destination address in the Destination Address field 31', can be taken the most frequent first destination address or the most nearby first destination address. However, it should be apparent that any destination address can be taken as a second destination address, but it is advantageous to choose a second destination address that is nearby all or a large number of the original first destination addresses.

The content information part 41–44 of the second header part includes information for determining certain parameters of the first body parts 45, 46, 47 in the data part 45–47 and for determining the number of first body parts 45,46,47 contained in the concatenated or second data packet 1'. In the shown example this is indicated by a Length Of Data Per Packet field 41 indicating the length of each packet. This field 41 is followed by First Data Packet Destination Address fields 42, 43, 44 indicating the original first destination addresses.

After preparing the second header part 2' and the content information part 41–44 of the second body part 4', the first body parts $4_i$, $4_j$, $4_k$ are extracted from the storing means and placed after the First Data Packet Destination Address fields 42, 43, 44, in the same order as the original first destination addresses are placed in the address field 42, 43, 44, whereby the concatenated or second data packet 1' is completed, as is diagrammatically shown in FIG. 3 D.

For the sake of simplicity, the example second data packet 1' shown in FIG. 2 contains three first body parts $4_i$, $4_j$, $4_k$ but is should be apparent that any number of first body parts $4_i$, $4_j$, $4_k$ can be contained in the data part 45–47 as long as the size of the second body part does not exceed the maximum size of a body part as is allowed by the specific type of data packet.

The concatenated or second data packet has a size of 106 bytes, of which 60 bytes (57%) is payload, which is an increase of 7% compared to the percentage of payload of the first data packet shown in FIG. 1. It should be apparent that the advantages of the invention increase with the number of first body parts $4_i$, $4_j$, $4_k$ contained in the second body part4'. For instance, if in the shown example method 1000 first data packets of the type shown in FIG. 1 would be contained in a concatenated or second data packet 2', the percentage of payload is 73%.

It is advantageous if the data part 45–47 contains the first body parts $4_i$, $4_j$, $4_k$ in a coded form and the content information part 41–44 contains information about the coding algorithm which has been applied. This allows a secure transfer of data packets if the coding algorithm is of an encrypting kind like public key encryption. If this coding algorithm is of a compressing kind, like prediction coding or entropy coding, the effective data percentage will increase even more, since redundant bits are removed from the payload.

After assembly of the concatenated or second data packet, it is transmitted to the second destination address. Before transmitting the concatenated or second data packet 1' or a multiple of concatenated or second data packets, a check data packet can be sent to the second destination address. In return the second destination address will send a return check data packet which contains an address type field. This makes it possible to determine the second address type and to transmit concatenated or second data packets only to addresses having facilities to extract the first body parts.

At a second destination address the concatenated or second data packets are received and the first body parts $4_i$, $4_j$, $4_k$ are extracted.

In order to extract the first body parts $4_i$, $4_j$, $4_k$ and restore the first data packets, the second header part 2' is determined. Also, from the second body part 4' the content information part 41–44 and the data part 45–47 are determined. The information in the content information part 41–44 makes it possible to distinguish each first body part $4_i$, $4_j$, $4_k$ and the corresponding original first destination address. Thus, the first body parts and first destination addresses are extracted and stored in storing means.

Thereafter, the first data packets $4_i$, $4_j$, $4_k$ are reconstructed by preparing for each first data packet $1_i$, $1_j$, $1_k$ the first header part $2_i$, $2_j$, $2_k$ and placing the first body part $4_i$, $4_j$, $4_k$ behind the first header part. There after the reconstructed first data packets are transmitted to their original first destination addresses. But it is also possible that the original first destination addresses are the same as the second addresses, in such case the first data packets do not have to be transmitted, of course.

It is of course possible to extract all first body parts from the concatenated or second data packet at a single address, but it is equally possible to extract only a few first body parts and transmit the remaining part of the concatenated or second data packet to a third destination address. It is also possible to extract all first body parts and then transmit only some of the first data packets individually further, while preparing a new second data packet containing the not further transmitted first data packets as well as new first data packets and transmit this new second data packet to a third destination address.

It is advantageous to apply a method according to an aspect of the invention at network nodes connected to each other by a connection of limited bandwidth. It is quite common that connections within a network do have a larger bandwidth than a connection from one network to another network. For example, computers in a typical Local Area Network (LAN) are usually connected to each other via an Ethernet connection of 10 megabits per second bandwidth whereas the LAN is connected to the Internet by a telephone cable of only 28.8 kilo bits per second bandwidth.

In such cases it is advantageous to apply a method according to an aspect of the invention at the connection of the LAN to the Internet. It is especially useful to perform the invention at a router device of a Wide Area Network. If the invention is applied to datagrams, the Wide Area Network may be a connectionless network.

FIG. 4 shows an example of a device 5 arranged for performing a method for assembling and transmitting a data packet according to an aspect of the invention. The device 5 includes an input port 51, for receiving data packets, extracting means 56 connected to the input port 51, for extracting from first data packets the original first destination addresses and the first body parts, packet preparation means 57, routing means 55 and output ports 52, 53, 54.

The extracting means include: first determining means 561 for determining the first header part of each first data packet, second determining means 562 for determining from the first header part the original first destination address of the first data packet, first storing means 563 connected to the first determining means and second storing means 564 connected to the second determining means for storing the original first destination addresses and storing the first body parts, respectively. Furthermore, the extracting means are provided with dropping means 565 for discarding the first header part.

Connected to the extracting means 56 are packet preparation means 57 for assembling a concatenated or second data packet. These packet preparation means 57 include second header part preparation means 571 for preparing the second header part and second body part preparation means 572 for preparing the second body part The device shown in FIG. 4 is a router device. It is therefore provided with routing means 55 connected between the input port 51 and output ports 52, 53, 54 through means 56 and 57 for routing data packets to one of the output ports 52,53,54.

In the example shown, the router device is adapted to route TCP/IP datagrams, but it should be apparent that any kind of router device can be used.

FIG. 5 shows a data packet receiver device 6. Device 6 includes input ports 61, 62, 63 for receiving and processing concatenated data packets 1'; extracting means 66 for extracting from a concatenated or second data packet 1' first body parts $4_i$, $4_j$, $4_k$; and first destination addresses and an output port 64.

The extracting means include: first determining means 661 for determining the second header part; second determining means 662 for determining the position of first body parts in the second data part based on the information in the content information part; third determining means 663 connected to the second determining means 662 for determining the original first destination address of the first body parts; and storage means 664 connected to the first determining means 661 for storing extracted first body parts and the corresponding original first destination addresses.

Connected to the extracting means are first packet preparation means 67 for reconstructing the extracted first data packets $1_i$, $1_j$, $1_k$ from the extracted first body parts. These extracted data packets are transmitted to output port 64, where after they are transmitted to the original first destination address.

It should be clear that if the second destination address is the same as the original first destination address the first data packets do not have to be transmitted further.

The shown example of a data packet receiver device 6 is part of a router device. Therefor, it is provided with routing means 65 connected between the input ports and the output port through means 66. These routing means act in a similar way as the routing means 55 in the previously described transmitter device 5.

It is also possible to provide the device 6 with type determination means and switching means. The determination means determine the type of an incoming data packet, in particular whether it is a concatenated data packet 1' as described above or not. If the data packet is not a concatenated or second data packet 1' the switching means switch off the extracting means 66 and first packet preparation means 67 or route the data packet to the output port 64 without going through the extracting means 66.

Figure 6:
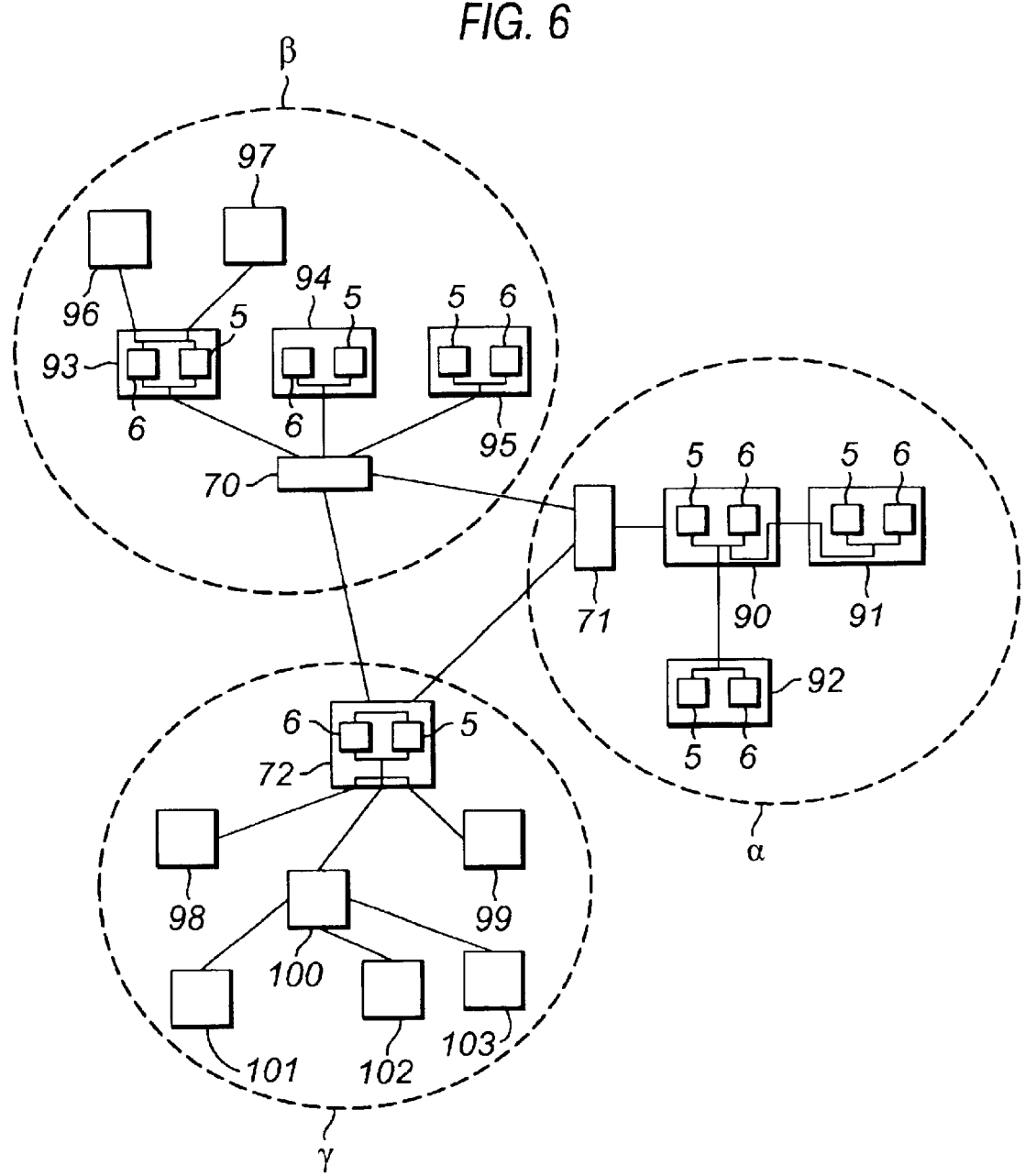
FIG. 6 diagrammatically shows a number of interconnected Wide Area Networks (WANs) in each of which an embodiment constructed according to an aspect of the invention is applied.

Similar to the device for transmitting a data packet, the receiver device 6 too can be implemented in a TCP/IP router device FIG. 6 shows three Wide Area Networks WANs α, β, γ, each including a number of network devices 90–92, 93–96, and 98–103 respectively. The WANs α, β, γ, are connected by router devices 70–72 to each other via network connections. Each of the WANs α, β, γ is connected to the other WANs α, β, γ in such a manner that the data packets sent between the WANs are concatenated or second data packets 1'. As can be seen, this may be achieved in various ways. As described before, the invention can be applied in a router device 72 which in this example includes both devices 5, 6 according to an aspect of the present invention.

According to an aspect of the invention, its principles can also be applied in all network devices 90–92 as in WAN α. This is advantageous if the connections between the network devices are of limited bandwidth.

It is also possible, as illustrated in WAN β, to provide the network devices 93–95 directly connected to the router device 70 with a data packet transmitter device 5 and a data packet receiver device 6. This is useful if a number of sub-networks 93;96–97, 94 and 95 situated at different locations are connected to each other via a telephone line and share a single router device 70.

It should be apparent to the worker in this field of art that the invention is not limited to application in a physical device as described, but can likewise be applied in another device and the invention is especially not limited to physical implementation but can likewise be implemented in a more abstract manner, like in a computer program running on a network computer.

The above-described embodiment of the invention is merely one example of a way in which the invention may be carried out. Other ways may also be possible and are within the scope of the following claims defining the invention.

What is claimed is:

1. A method for transmitting a data packet, characterised by the steps of:

extracting from each of at least two first data packets $(1,1_i,1_j,1_k)$ an original first destination address (31) and a first body part $(4,4_i,4_j,4_k)$ containing data to be transmitted by the first data packet $(1,1_i,1_j,1_k)$, the extracting step including:

determining a first header part $(2,2_i,2_j,2_k)$ of each first data packet $(1,1_i,1_j,1_k)$, said first header part $(2,2_i,2_j,2_k)$ containing data packet specific information including an original first destination address (31), determining from each of said first header parts $(2,2_i,2_j,2_k)$ the original first destination address (31) of the first data packet $(1,1_i,1_j,1_k)$, storing the original first destination address (31) of the corresponding first data packet $(1,1_i,1_j,1_k)$ in second storing means (572), discarding the first header parts $(2,2_i,2_j,2_k)$, storing in first storing means (571) a remaining part of each of the first data packets, as a first body part $(4,4_i,4_j,4_k)$, making a concatenated or second data packet (1'), the concatenated or second data packet (1') including:

a second header part (2') containing second data packet specific information including a second destination address (31') for the concatenated or second data packet, a second body part (4',41–47) including: a data part (45–47) including the first body parts $(4,4_i,4_j,4_k)$ of said first data packets $(1,1_i,1_j,1_k)$ and a content information part (41–44) including information determining the position of each of the first body parts $(4,4_i,4_j,4_k)$ in the data part, the number of first body parts $(4,4_i,4_j,4_k)$ contained in the concatenated or second data packet (1') and said original first destination addresses (31) of the first body parts $(4,4_i,4_j,4_k)$, transmitting the concatenated or second data packet (1') to said second destination address (31').

2. A method as claimed in claim 1, wherein before transmitting the concatenated or second data packet (1'), a check data packet is transmitted to the second destination address, for determining a type of the second destination address (31') based on a return check data packet transmitted by the second destination address (31') in response to the check data packet.

3. A method as claimed in claim 1, wherein the first data packets ($1,1_i,1_j,1_k$) are first datagrams and the concatenated or second data packet 1' is a second datagram.

4. A method as claimed in claim 3, wherein the first datagrams and second datagram are IP-datagrams.

5. A method as claimed in claim 1, wherein the first body parts (4') are coded with a coding algorithm before the concatenated or second data packet (1') is made and information about the coding algorithm is included in the content information part (41–44).

6. A method as claimed in claim 1, wherein the method is performed at a router device (70–72) of a Wide Area Network ($\alpha$, $\beta$, $\gamma$).

7. A method as claimed in claim 6, wherein the method is performed in a connectionless Wide Area Network ($\alpha$, $\beta$, $\gamma$).

8. A method for receiving data packets transmitted by a transmitting method as claimed in claim 1, characterised by the steps of:
   receiving a concatenated or second data packet (1'),
   extracting each of said first body parts ($4,4_i,4_j,4_k$) contained in the concatenated or second data packet (1') from the concatenated or second data packet (1'), the extracting step including:
   determining a second header part (2') containing second data packet specific information, and
   a second body part (4') including: a content information part (41–44) including information for determining the position of each of the first body parts (4, $4_i,4_j,4_k$) in a data part (45–47) and information for determining a number of first body parts (4, $4_i,4_j,4_k$) contained in the concatenated or second data packet (1'), and the content information part (41–44) further containing information about the original first destination addresses (31) of the first body parts (4, $4_i,4_j,4_k$), and a data part (45–47) including the first body parts (4, $4_i,4_j,4_k$),
   storing at least one first body part (4, $4_i,4_j,4_k$) and the corresponding original first destination address (31) in storing means (664),
   reconstructing at least one first data packet ($1,1_i,1_j,1_k$), including a first header part ($2,2_i,2_j,2_k$) containing packet specific information and the original first destination address (31), and the first body part (4, $4_i,4_j,4_k$).
   transmitting the at least one first data packet ($1,1_i,1_j,1_k$) to the corresponding original first destination address (31).

9. A method as claimed in claim 7, wherein the concatenated or second data packet (1') is a second datagram and the first data packet ($1,1_i,1_j,1_k$) is a first datagram.

10. A method as claimed in claim 8, wherein the first and second datagrams are IP-datagrams.

11. A method as claimed in claim 7, wherein after extracting one or more first data packets ($1,1_i,1_j,1_k$), a remainder of the concatenated or second data packet is transmitted (1') to a third destination address.

12. A method as claimed in claim 7, wherein a number of the first data packets (1, $1_i,1_j,1_k$) contained in the second body part (4') are extracted, at least one of the first data packets (1, $1_i,1_j,1_k$) is transmitted to an original first destination address (31) and at least one remaining data packet and at least one new first data packet are concatenated and are transmitted to the third destination address.

13. A method as claimed in claim 1, wherein the method is performed at a router device (70–72) of a Wide Area Network ($\alpha$, $\beta$, $\gamma$).

14. A data packet transmitter device having:
   at least one input port (51), for receiving first data packets,
   extracting means (56) connected to the input port, for extracting from each of at least two first data packets an original first destination address (31) and a first body part (4, $4_i,4_j,4_k$) containing data to be transmitted by the first data packet (1, $1_i,1_j,1_k$), the extracting means including:
   first determining means (561) for determining a first header part (2, $2_i,2_j,2_k$) of each first data packet(1, $1_i,1_j,1_k$), the first header part (2, $2_i,2_j,2_k$) containing data packet specific information including an original first destination address (31),
   second determining means (562) for determining from each of said first header parts (2, $2_i,2_j,2_k$) the original first destination address of each of the first data packets (1, $1_i,1_j,1_k$),
   first storing means (563) for storing the original first destination addresses (31),
   dropping means (565) for discarding the first header parts (2, $2_i,2_j,2_k$),
   second storing means (564) for storing first body parts (4, $4_i,4_j,4_k$) of the first data packets (1, $1_i,1_j,1_k$),
   packet preparation means (57) connected to said extracting means (56) for making a concatenated or second data packet (1'), including:
   second header part preparation means (571) for preparing a second header part (2') containing second data packet specific information including a second destination address (31'),
   second body part preparation means (572) for preparing a second body part (4',41–47) including: a content information part (41–44) including information for determining a position of first body parts (4, $4_i,4_j,4_k$) in a data part (45–47) of the second body part, the number of first body parts (4, $4_i,4_j,4_k$) contained in the concatenated or second data packet (1') and original first destination addresses (31) of said first body parts (4, $4_i,4_j,4_k$), and said data part (45–47) including said first body parts (4, $4_i,4_j,4_k$),
   at least one output port (52–54) connected to said packet preparation means (57) for transmitting the concatenated or second data packet (1') to the second destination address (31').

15. A router device, having a transmitter device (5) as claimed in claim 14 and the router device further including routing means (55) connected to the transmitter device (5) between the at least one input port (51) and at least one of the at least one output ports (52–54) for routing data packets (1,1') to one of the at least one output ports (52–54).

16. A router device as claimed in claim 15 wherein the router device (70–72) is a TCP/IP router device (70–72).

17. A data packet receiver device (6), including
   an input port (61–63) for receiving data packets,
   extracting means (66) for extracting first body parts (4, $4_i,4_j,4_k$) and original first destination addresses (31) from a concatenated or second data packet (1'), the extracting means (66) including:
   first determining means (661) for determining a second header part (2') containing second data packet (1') specific information, and a second body part (4'),
   second determining means (662) for determining a position of each of the first body parts (4, $4_i,4_j,4_k$) in a second data part (45–47) of the second body part (4',41–47) based on information in a content information part (41–44) of the second body part (4',41–47), third determining means (663) for determining from the content information part (41–44) an original first destination address (31) of each of the first body parts (4, 4$_i$,4$_j$,4$_k$), storage means (664) for storing at least one first body part (4, 4$_i$,4$_j$,4$_k$) and the corresponding original first destination address (31), first packet preparation means (67) for reconstructing at least one extracted first data packet, including a first body part (4, 4$_i$,4$_j$,4$_k$) and a first header part (2, 2$_i$,2$_j$,2$_k$), the first header part containing extracted first packet specific information and the original first destination address (31), an output port (64) for transmitting the first data packet (1, 1$_i$,1$_j$,1$_k$) to the original first destination address (31).

18. A router device having a receiver device (6) according to claim 17 and further including routing means (65) connected to the receiver device (6) between the at least one input port (61–63) and at least one output port (64) for routing data packets to one of the at least one output ports (64).

19. A router device as claimed in claim 18, further including type determination means for determining a type of an incoming data packet, and switching means for switching off or bypassing the extracting means (66) and first packet preparation means (67) if the type of the incoming data packet is not a concatenated or second data packet (1').

20. A router device as claimed in claim 18, wherein the router device is an TCP/IP router device (70–72).

21. A Wide Area Network ($\alpha$, $\beta$, $\gamma$), including at least two network devices (70–72;90–103) connected to each other via a network connection, wherein at least one of the devices (70–72;90–103) includes a data packet transmitter device (5) according to claim 14 and at least one of the devices includes a data packet receiver device (6), said data packet receiver device having:

an input port (61–63) for receiving data packets, extracting means (66) for extracting first body parts (4, 4$_i$,4$_j$,4$_k$) and original first destination addresses (31) from a concatenated or second data packet (1'), the extracting means (66) including:

first determining means (661) for determining a second header part (2') containing second data packet (1') specific information, and a second body part (4'), second determining means (662) for determining a position of each of the first body parts (4, 4$_i$,4$_j$,4$_k$) in a second data part (45–47) of the second body part (4', 41–47) based on information in a content information part (41–44) of the second body part (4',41–47), third determining means (663) for determining from the content information part (41–44) an original first destination address (31) of each of the first body parts (4, 4$_i$,4$_j$,4$_k$), storage means (664) for storing at least one first body part (4, 4$_i$,4$_j$,4$_k$) and the corresponding original first destination address (31), first packet preparation means (67) for reconstructing at least one extracted first data packet, including a first body part (4, 4$_i$,4$_j$,4$_k$) and a first header part (2, 2$_i$,2$_j$,2$_k$), the first header part containing extracted first packet specific information and the original first destination address (31), and an output port (64) for transmitting the first data packet (1, 1$_i$,1$_j$,1$_k$) to the original first destination address (31).

* * * * *